(12) United States Patent
Kirisawa

(10) Patent No.: US 8,620,225 B2
(45) Date of Patent: Dec. 31, 2013

(54) POWER DETECTION CIRCUIT, TRANSMITTER, AND POWER DETECTION METHOD

(75) Inventor: Akihiro Kirisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 340 days.

(21) Appl. No.: 13/124,674

(22) PCT Filed: Nov. 2, 2009

(86) PCT No.: PCT/JP2009/068766
§ 371 (c)(1),
(2), (4) Date: Apr. 18, 2011

(87) PCT Pub. No.: WO2010/070985
PCT Pub. Date: Jun. 24, 2010

(65) Prior Publication Data
US 2011/0237291 A1    Sep. 29, 2011

(30) Foreign Application Priority Data

Dec. 15, 2008    (JP) .................................. 2008-318516

(51) Int. Cl.
*H04W 74/00*    (2009.01)
(52) U.S. Cl.
USPC ........................................ 455/69; 455/115.3
(58) Field of Classification Search
USPC ....................................................... 455/24, 73
See application file for complete search history.

(56) References Cited

U.S. PATENT DOCUMENTS

| | | | |
|---|---|---|---|
| 2001/0039198 A1 | 11/2001 | Onishi et al. | |
| 2003/0076168 A1* | 4/2003 | Forrester | 330/129 |
| 2005/0026573 A1* | 2/2005 | Cho | 455/114.2 |
| 2005/0042989 A1* | 2/2005 | Ho | 455/78 |
| 2005/0159119 A1* | 7/2005 | Kataoka et al. | 455/127.2 |
| 2006/0003716 A1 | 1/2006 | Hayashihara | |
| 2007/0222629 A1 | 9/2007 | Yoneyama | |

FOREIGN PATENT DOCUMENTS

| | | |
|---|---|---|
| CN | 1374760 A | 10/2002 |
| CN | 1957550 A | 5/2007 |
| JP | 10-51252 A | 2/1998 |
| JP | 10-224314 A | 8/1998 |
| JP | 2002152060 A | 5/2002 |
| JP | 2003525455 A | 8/2003 |
| JP | 2003-528533 A | 9/2003 |
| JP | 2006166153 A | 6/2006 |
| JP | 2006333023 A | 12/2006 |
| JP | 2007251333 A | 9/2007 |
| JP | 2008085849 A | 4/2008 |
| JP | 2008147934 A | 6/2008 |
| JP | 2008193719 A | 8/2008 |
| WO | 2005117309 A | 12/2005 |

OTHER PUBLICATIONS

International Search Report for PCT/JP2009/068766 mailed Dec. 8, 2009.
Chinese Office Action for CN Application No. 200980149106.5 issued on May 29, 2013 with English Translation.

* cited by examiner

*Primary Examiner* — Tu X Nguyen

(57) ABSTRACT

From an antenna provided in a transmitter for transmitting a radio signal, the radio signal is transmitted in such a manner of: detecting transmission power of a transmission signal outputted to the antenna; detecting reflection power of a reflection signal reflected from the antenna; integrating the difference between the transmission power and the reflection power at a timing of transmitting a preamble signal of the radio signal; comparing the difference value obtained by the integration with a predetermined threshold value, and outputting an alarm in the case where the result of the comparison is that the difference value obtained by the integration is smaller than the threshold value.

10 Claims, 13 Drawing Sheets

POWER DETECTION CIRCUIT, TRANSMITTER, AND POWER DETECTION METHOD

This application is the National Phase of PCT/JP2009/068766, filed Nov. 2, 2009, which claims the benefit of priority from Japanese Patent Application No. 2008-318516 filed in Japan on Dec. 15, 2008, the entire content of which is hereby incorporated by reference in the application and claims of the present application.

TECHNICAL FIELD

The present invention relates to a power detection circuit, a transmitter, and a power detection method for detecting electric power.

BACKGROUND ART

In a transmitter for transmitting a radio signal from an antenna, in order to detect a case where an abnormality, such as a failure or unconnected state of the antenna occurs in the antenna, a technique has been proposed which measures the reflection power reflected from the antenna and which detects the abnormality on the basis of the magnitude of the measured reflection power (see, for example, Patent Literature 1).

FIG. 1 is a diagram showing one form of a radio apparatus using a common power detection circuit.

The radio apparatus shown in FIG. 1 includes transmission signal output section 1000, power detection circuit 10, and antenna 4000. Transmission signal output section 1000 is an amplifier which outputs to antenna 4000 a transmission signal to cause a radio signal to be transmitted from antenna 4000.

Power detection circuit 10 detects the reflection power of the reflection signal reflected from antenna 4000.

Antenna 4000 transmits, as a radio signal, the transmission signal outputted from transmission signal output section 1000.

Further, power detection circuit 10 is configured by reflection power detection section 3000 and comparison section 7000. Further, reflection power detection section 3000 is configured by coupler 3001 and detector 3002.

Coupler 3001 branches the reflection signal reflected from antenna 4000, so as to output the branched signal to detector 3002.

Detector 3002 converts to a DC voltage the reflection power of the reflection signal outputted from coupler 3001. Further, detector 3002 outputs the converted voltage to comparison section 7000.

Comparison section 7000 compares the voltage outputted from detector 3002 with a preset threshold value. Further, when the comparison result is one in which the voltage outputted from detector 3002 is larger than the preset reference value (threshold value), comparison section 7000 outputs an alarm (ALM).

In the radio apparatus configured in this way, when the return loss (reflection power) from antenna 4000 is increased, the reflection power taken out (branched) by coupler 3001 is increased. The reflection power is detected by detector 3002, and then, in comparison section 7000, the detected reflection power is compared with the reference value to determine whether or not an alarm is to be issued.

Here, the reflection power is proportional to the transmission power of the transmission signal outputted from transmission signal output section 1000. Therefore, when the transmission power is small, it is not possible to determine the abnormality of antenna 4000. In the case where the transmission power is too large, even when the return loss (reflection power) of antenna 4000 is in a normal range, there is a case where, since the absolute value of the reflection power is large, the state of antenna 4000 is determined to be abnormal.

In this way, since an accurate determination cannot be made according to the change in the transmission power, there is a problem that, when the signal level is successively changed as in the case of a burst signal, a correct determination cannot he made.

Thus, in addition to the configuration shown in FIG. 1, a technique has been proposed in which the transmission power transmitted from the amplifier to the antenna is also detected so that the abnormality is detected on the basis of the difference between the detected transmission power and the reflection power (see, for example, Patent Literature 2).

CITATION LIST

Patent Literature

Patent Literature 1: JP2008-085849A
Patent Literature 2: JP2003-525455A

SUMMARY OF INVENTION

Technical Problem

However, in the technique described in Patent Literature 2, there is a problem that, when the transmission power and the reflection power are small, the voltage characteristics detected by the diode are varied. In this way, when the detected voltage is varied, an error may be caused in the calculation of return loss (reflection power) so that accurate determination cannot be made.

An object of the present invention is to provide a power detection circuit, a transmitter, and a power detection method for solving the above-described problems.

Solution to Problem

A power detection circuit according to the present invention includes:

a transmission power detection section that detects transmission power of a transmission signal which, in order to cause a radio signal to be transmitted from an antenna provided in a transmitter for transmitting the radio signal, is outputted to the antenna;

a reflection power detection section that detects reflection power of a reflection signal reflected from the antenna;

an integration section that integrates the difference between the transmission power and the reflection power at a timing of transmitting a preamble signal of the radio signal; and a comparison section that compares the difference value obtained by the integration by the integration section with a predetermined threshold value and that outputs an alarm in the case where the result of the comparison is that the difference value obtained by the integration by the integration section is smaller than the predetermined threshold value.

Further, a transmitter according to the present invention includes:

the power detection circuit;
the antenna; and
a transmission signal output section that outputs a transmission signal to the antenna in order to cause the radio signal to be transmitted from the antenna.

Further, a power detection method according to the present invention includes:

a process that detects transmission power of a transmission signal which, in order to cause a radio signal to be transmitted from an antenna provided in a transmitter for transmitting the radio signal, is outputted to the antenna;

a process that detects reflection power of a reflection signal reflected from the antenna;

a process that integrates the difference between the transmission power and the reflection power at a timing of transmitting a preamble signal of the radio signal;

a process that compares the difference value obtained by the integration with a predetermined threshold value; and a process that outputs an alarm in the case where the result of the comparison is that the difference value obtained by the integration is smaller than the threshold value.

Advantageous Effects of Invention

As described above, the present invention is configured for: detecting transmission power of a transmission signal which, in order to cause a radio signal to be transmitted from an antenna provided in a transmitter for transmitting the radio signal, is outputted to the antenna; detecting reflection power of a reflection signal reflected from the antenna; integrating the difference between the transmission power and the reflection power at a timing of transmitting a preamble signal of the radio signal; comparing the difference value obtained by the integration with a predetermined threshold value; and outputting an alarm in the case where the result of the comparison is that the difference value obtained by the integration is smaller than the threshold value. Thereby, it is possible to accurately detect an abnormal state of the antenna port irrespective of the magnitude of the transmission power.

DESCRIPTION OF EMBODIMENTS

In the following, exemplary embodiments will be described with reference to the accompanying drawings.

First Exemplary Embodiment

Figure 1:
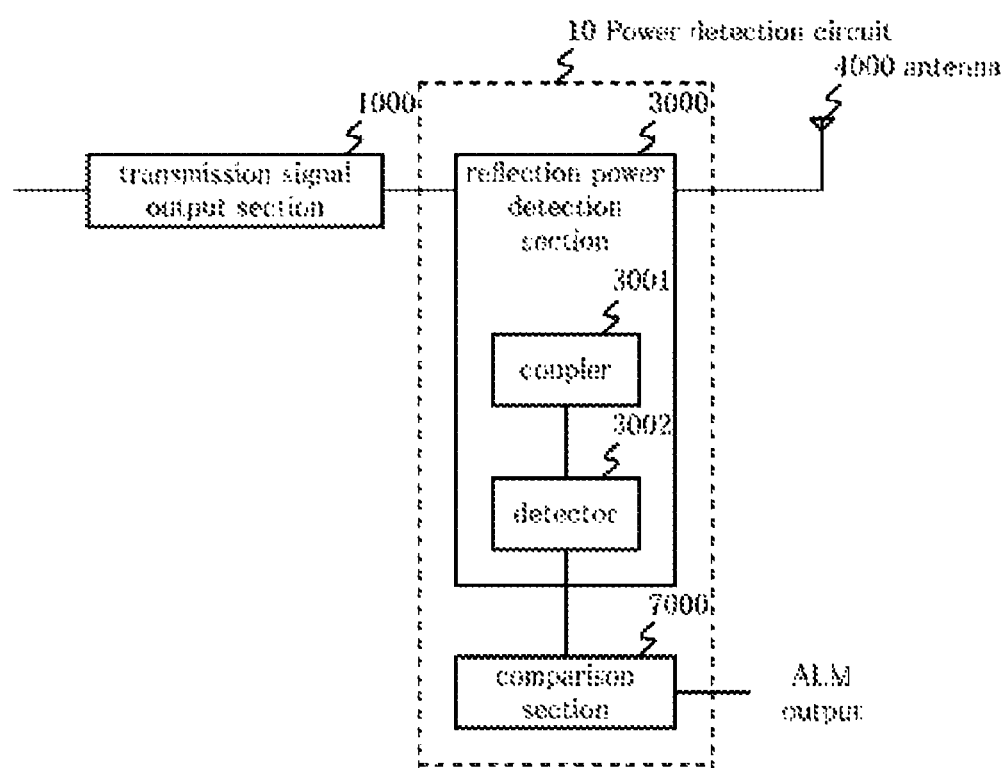
FIG. 1 is a diagram showing one form of a radio apparatus using a common power detection circuit.
Figure 2:
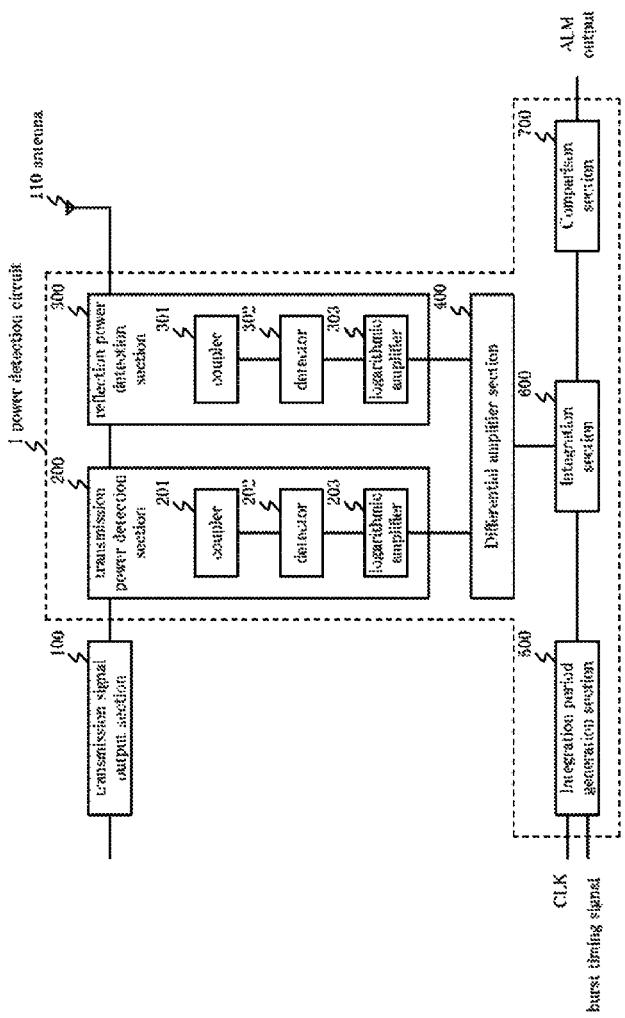
FIG. 2 is a diagram showing a first exemplary embodiment of a power detection circuit according to the present invention.

FIG. 2 is a diagram showing a first exemplary embodiment of a power detection circuit according to the present invention.

As shown in FIG. 2, the exemplary embodiment is configured by transmission signal output section 100, power detection circuit 1 according to the present invention, and antenna 110.

Transmission signal output section 100 is an amplifier which outputs to antenna 110 a transmission signal for causing a radio signal to be transmitted from antenna 110.

Power detection circuit 1 detects transmission power of the transmission signal outputted from transmission signal output section 100 to antenna 110. Further, power detection circuit 1 detects reflection power of a reflection signal reflected from antenna 110.

Antenna 110 transmits, as a radio signal, the transmission signal outputted from transmission signal output section 100.

Further, power detection circuit 1 is configured by transmission power detection section 200, reflection power detection section 300, differential amplifier section 400, integration period generation section 500, integration section 600, and comparison section 700.

Transmission power detection section 200 detects transmission power of the transmission signal outputted from transmission signal output section 100 to antenna 110.

Further, transmission power detection section 200 is configured by coupler 201, detector 202, and logarithmic amplifier 203.

Coupler 201 is a first directional coupler for branching the transmission signal outputted from transmission signal output section 100 to antenna 110 and for outputting the branched signal to detector 202.

Detector 202 is a first detector for converting to a first DC voltage the transmission power of the transmission signal outputted from coupler 201. Further, detector 202 outputs the first DC voltage to logarithmic amplifier 203.

Logarithmic amplifier 203 is a first logarithmic amplifier for logarithmically converting the DC voltage outputted from detector 202 to obtain a transmission voltage corresponding to the transmission power. Further, logarithmic amplifier 203 outputs the transmission voltage to differential amplifier section 400.

Reflection power detection section 300 detects reflection power of a reflection signal reflected from antenna 110.

Further, reflection power detection section 300 is configured by coupler 301, detector 302, and logarithmic amplifier 303.

Coupler 301 is a second directional coupler for branching the reflection signal reflected from antenna 110 and for outputting the branched signal to detector 302.

Detector 302 is a second detector for converting to a second DC voltage the reflection power of the reflection signal outputted from coupler 301. Further, detector 302 outputs the second DC voltage to logarithmic amplifier 303.

Logarithmic amplifier 303 is a second logarithmic amplifier for logarithmically converting the second DC voltage outputted from detector 302 to obtain a reflection voltage corresponding to the reflection power. Further, logarithmic amplifier 303 outputs the reflection voltage to differential amplifier section 400.

Differential amplifier section 400 takes the difference between the transmission voltage outputted from logarithmic amplifier 203 and the reflection voltage outputted from logarithmic amplifier 303, and outputs the difference to integration section 600.

Integration period generation section 500 generates an integration period on the basis of an operation clock and a burst timing signal. The burst timing signal will be described below. Integration period generation section 500 outputs the generated integration period to integration section 600.

Integration section 600 integrates the difference outputted from differential amplifier section 400 during the integration period outputted from integration period generation section 500. Further, integration section 600 outputs the integration value obtained by the integration to comparison section 700.

Comparison section 700 compares the integration value outputted from integration section 600 with a preset threshold value. Further, when the result of the comparison is that the integration value outputted from integration section 600 is smaller than the preset threshold value, comparison section 700 outputs an alarm (ALM).

The operation in the configuration shown in FIG. 2 will be described below.

A transmission signal for causing a radio signal to be transmitted from antenna 110 is amplified to a desired output and outputted by transmission signal output section 100.

The transmission signal outputted from transmission signal output section 100 is branched by coupler 201. That is, a part of the transmission signal is extracted by coupler 201.

On the other hand, when mismatching occurs between the output and the antenna, the transmission signal inputted to antenna 110 is reflected by antenna 110, so that a reflection signal is returned toward transmission signal output section 100.

The reflection signal is branched by coupler 301. That is, a part of the reflection signal is extracted by coupler 301.

Thereafter, the output of the coupling port of coupler 201 is outputted to detector 202. Further, the output of the coupling port of coupler 301 is outputted to detector 302.

Then, the transmission power outputted from coupler 201 is converted (detected) by detector 202 to a DC voltage. Further, the reflection power outputted from coupler 301 is converted (detected) by detector 302 to a DC voltage.

Here, the voltage conversion characteristics of detector 202 and 302 are described.

Figure 3:
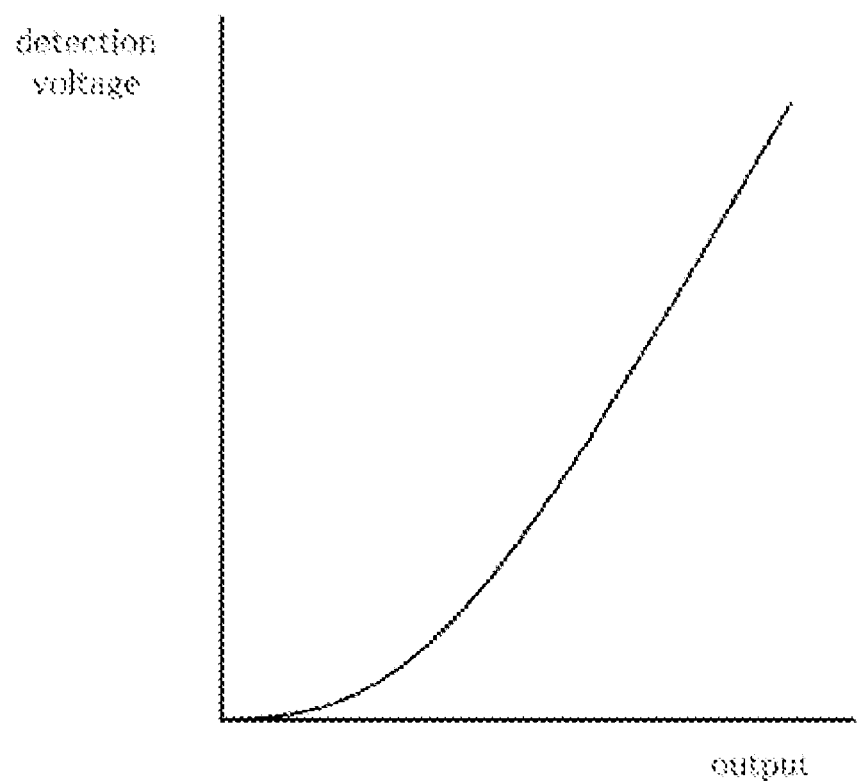
FIG. 3 is a diagram showing the voltage conversion characteristics of the detector shown in FIG. 2.

FIG. 3 is a diagram showing the voltage conversion characteristics of detectors 202 and 302 shown in FIG. 2.

As shown in FIG. 3, the voltage conversion characteristics of detectors 202 and 302 are exponential function characteristics. This is because a diode is usually used in each of detectors 202 and 302 and because the voltage conversion characteristics of detectors 202 and 302 depend on the characteristics of the diode.

The DC voltage resulting from the conversion by detector 202 is logarithmically converted by logarithmic amplifier 203. Further, the DC voltage resulting from the conversion by detector 302 is logarithmically converted by logarithmic amplifier 303.

Figure 4:
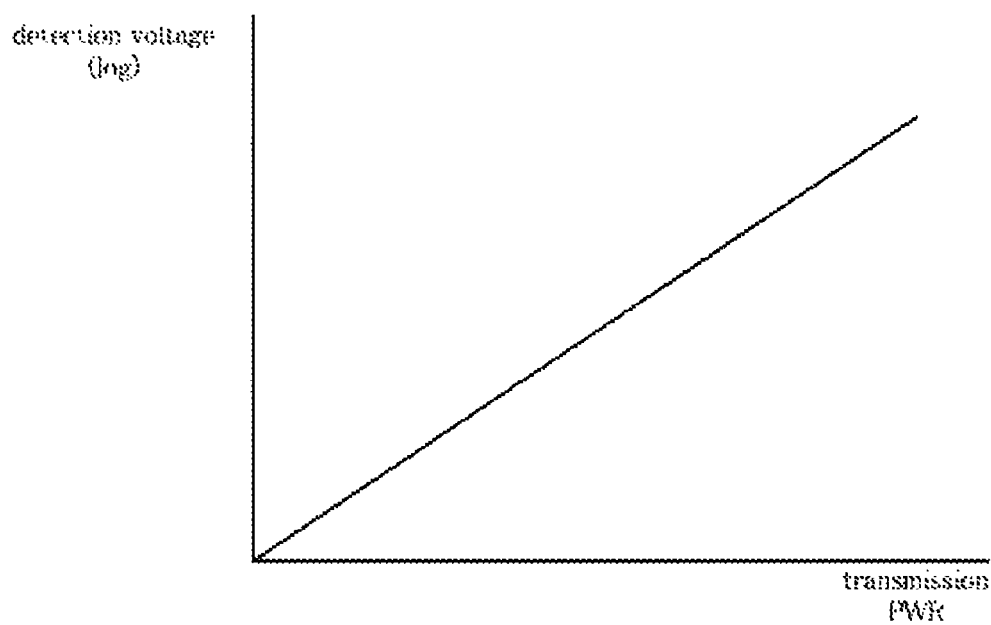
FIG. 4 is a diagram showing a characteristic of transmission power (reflection power) logarithmically converted by the logarithmic amplifier shown in FIG. 2 with respect to detection (DC) voltage.

FIG. 4 is a diagram showing a characteristic of the transmission power (reflection power) logarithmically converted by each of logarithmic amplifier 203 and 303 shown in FIG. 2 with respect to the detection (DC) voltage.

As shown in FIG. 4, the detection voltage exhibits substantially a linear characteristic with respect to the transmission power (reflection power).

When the logarithmically converted transmission voltage is outputted from logarithmic amplifier 203, and when the logarithmically converted reflection voltage is outputted from logarithmic amplifier 303, the difference between the transmission voltage outputted from logarithmic amplifier 203 and the reflection voltage outputted from logarithmic amplifier 303 is calculated by differential amplifier section 400. When an abnormal state (in other words, degradation of return loss in the antenna port), such as an unconnected state of antenna 110 and a disconnection state of cable to antenna 110, occurs, the reflection voltage is increased. The transmission voltage and the reflection voltage, which are respectively proportional to the transmission power and the reflection power, are outputted from logarithmic amplifier 203 and 303, respectively. For this reason, when the difference between the transmission voltage and the reflection voltage is calculated, the abnormal state (degradation of return loss in the antenna port) can be detected irrespective of the magnitude of the transmission signal, that is, the magnitude of the transmission power. In differential amplifier section 400, the difference between the transmission voltage and the reflection voltage is calculated, and the difference (voltage) proportional to the return loss of the antenna port is outputted.

Here, a signal transmitted by using a time division duplex (TDD) system is considered.

Figure 5:
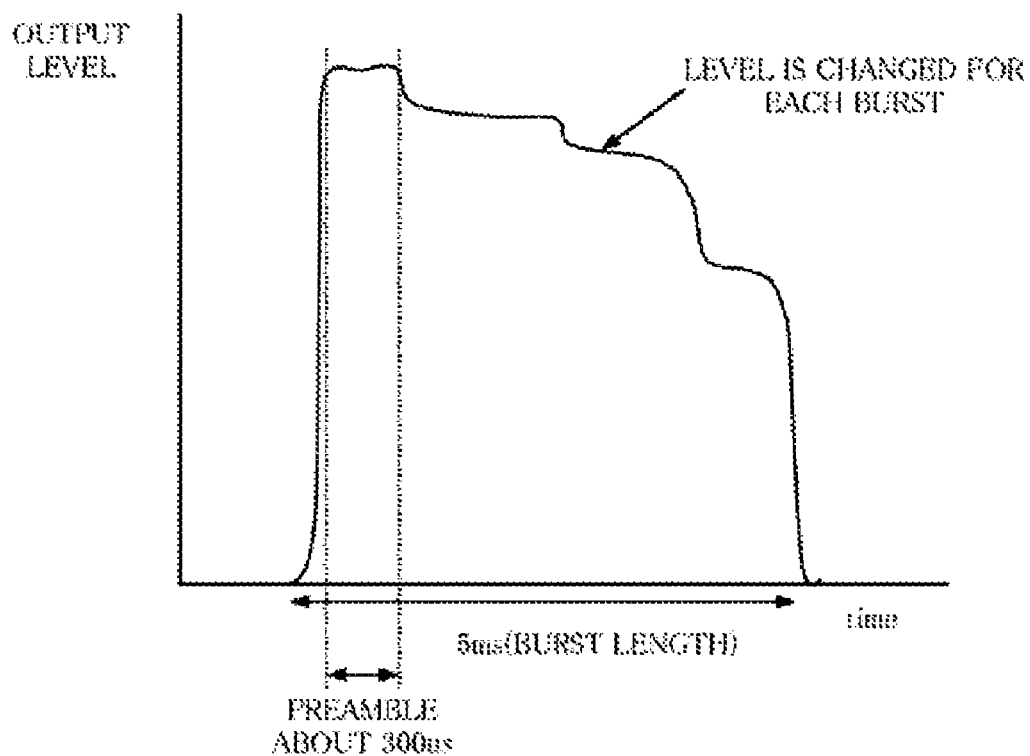
FIG. 5 is a diagram showing temporal changes of the output (power) level of a signal transmitted by using a time division duplex system.

FIG. 5 is a diagram showing temporal changes of the output (power) level of a signal transmitted by using the time division duplex system.

As shown in FIG. 5, the signal transmitted by using the time division duplex system is formed as a burst-type (burst wave) signal. Further, the output (power) level of the signal is changed with time. The burst wave signal includes a preamble signal used to effect the synchronization of a modem of a terminal, and hence the portion corresponding to the preamble signal is configured so that a signal having power of a fixed level or more is surely outputted.

In the exemplary embodiment, the degradation of return loss in the antenna port is not detected in all (time) periods, but the degradation of return loss in the antenna port is detected only in the period of the preamble signal.

The output of differential amplifier section 400 is inputted to integration section 600, while the integration time (integration period) is determined by integration period generation section 500.

Figure 6:
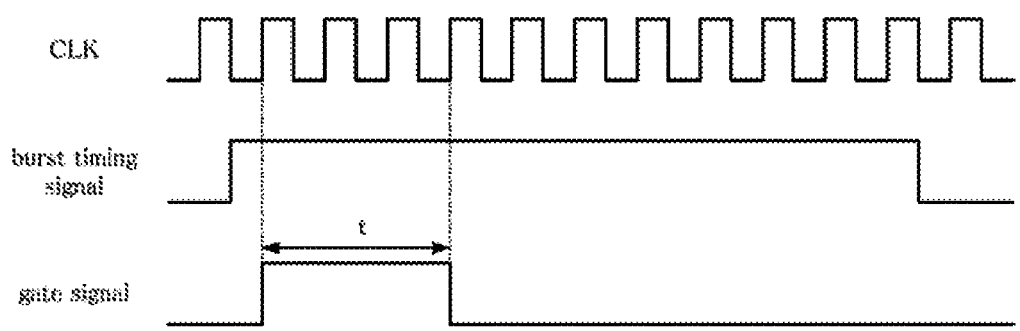
FIG. 6 is a diagram showing a state in which an integration period is generated in the integration period generation section shown in FIG. 2.

FIG. 6 is a diagram showing a state in which an integration period is generated in integration period generation section 500 shown in FIG. 2.

As shown in FIG. 6, a burst timing signal synchronized with a burst period, and a clock (CLK) are inputted to integration period generation section 500, so that a control signal (gate signal) with preset integration period (t) is generated by counting the clock pulses from the burst timing signal.

In integration section 600, an integration value is obtained during a fixed period corresponding to the integration period generated by integration period generation section 500. That is, an integration value of the difference value between the transmission voltage corresponding to the transmission power and the reflection voltage corresponding to the reflection power is obtained by integration section 600 during the preamble time of the burst wave, and the obtained integration value is outputted from integration section 600.

Then, the integration value outputted from integration section 600 is compared with the preset threshold value (reference value) in comparison section 700. When the result of the comparison is that the integration value is smaller than the reference value (when the difference between transmission voltage and the reflection voltage becomes small, that is, the return loss is degraded), an alarm (ALM) is outputted from comparison section 700.

If, when the alarm (ALM) is outputted, the operation of transmission signal output section 100 is controlled to be turned off, it is possible to prevent transmission signal output section 100 from being damaged when the return loss is degraded, such as when the antenna is not connected.

As described above, in the circuit for outputting a signal from transmission signal output section 100 to antenna 110, not only the power in the reflection direction but also the power in the propagation direction are used, and the logarithmic values of the detected voltages of the power in the respective directions are compared with each other, so that an abnormal state of the antenna port can be detected irrespective of the magnitude of the transmission power. This is based on the principle that, since the return loss is degraded in an abnormal state of the antenna port, the return loss can be calculated by obtaining the ratio between the transmission power (voltage) and the reflection power (voltage).

Further, when the input power is small, the variation of the detection voltage is increased due to the characteristics of the diode.

Figure 7:
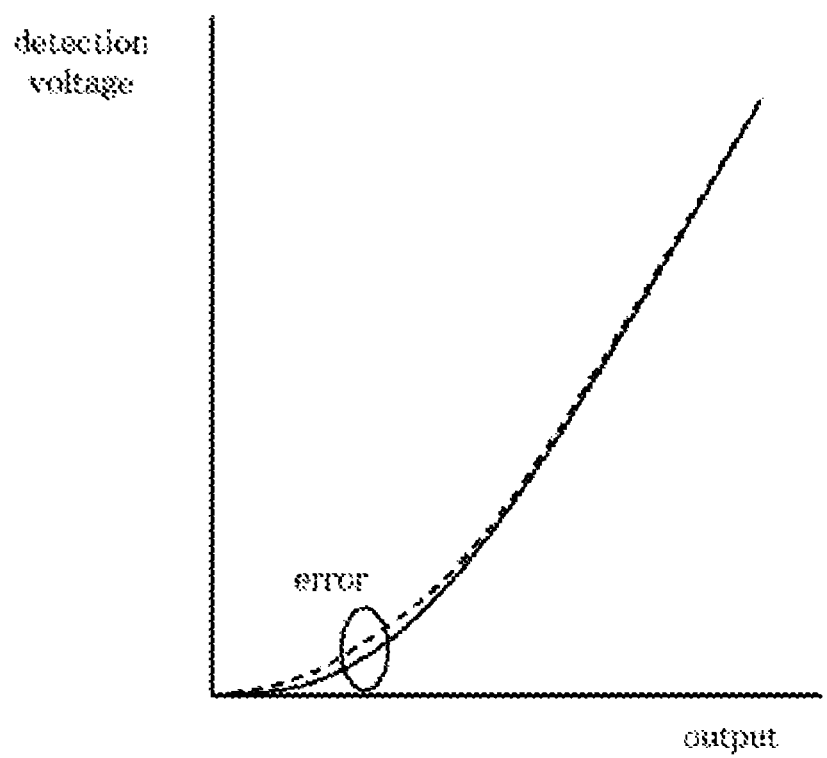
FIG. 7 is a diagram showing characteristics in which the detection voltage is varied in an area of small input power.
Figure 8:
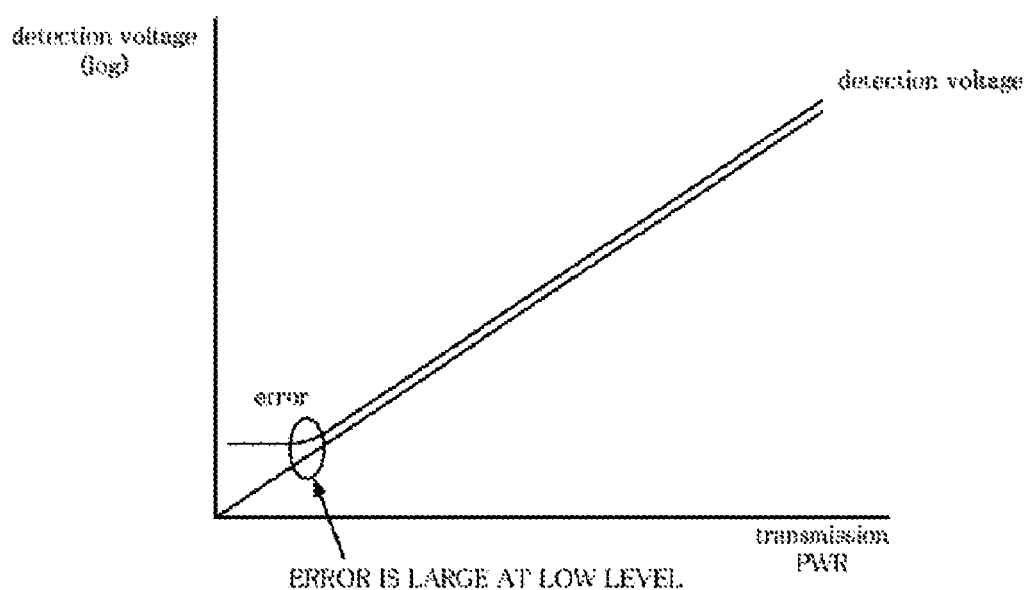
FIG. 8 is a diagram showing characteristics in which the logarithmically amplified detection voltage is varied in an area of small input power.

FIG. 7 is a diagram showing characteristics in which the detection voltage is varied in an area of small input power. FIG. 8 is a diagram showing characteristics in which the logarithmically amplified detection voltage is varied in an area of small input power.

As shown in FIG. 7 and FIG. 8, when the signal is small, the detection voltage is varied, and hence an error may be caused in the calculation of return loss so that an accurate determination cannot be made.

For this reason, in the present invention, an erroneous determination is avoided in such a manner that only the preamble period of the burst signal is used for the determination, and that the small signal portion is not used in the calculation of return loss.

Figure 9:
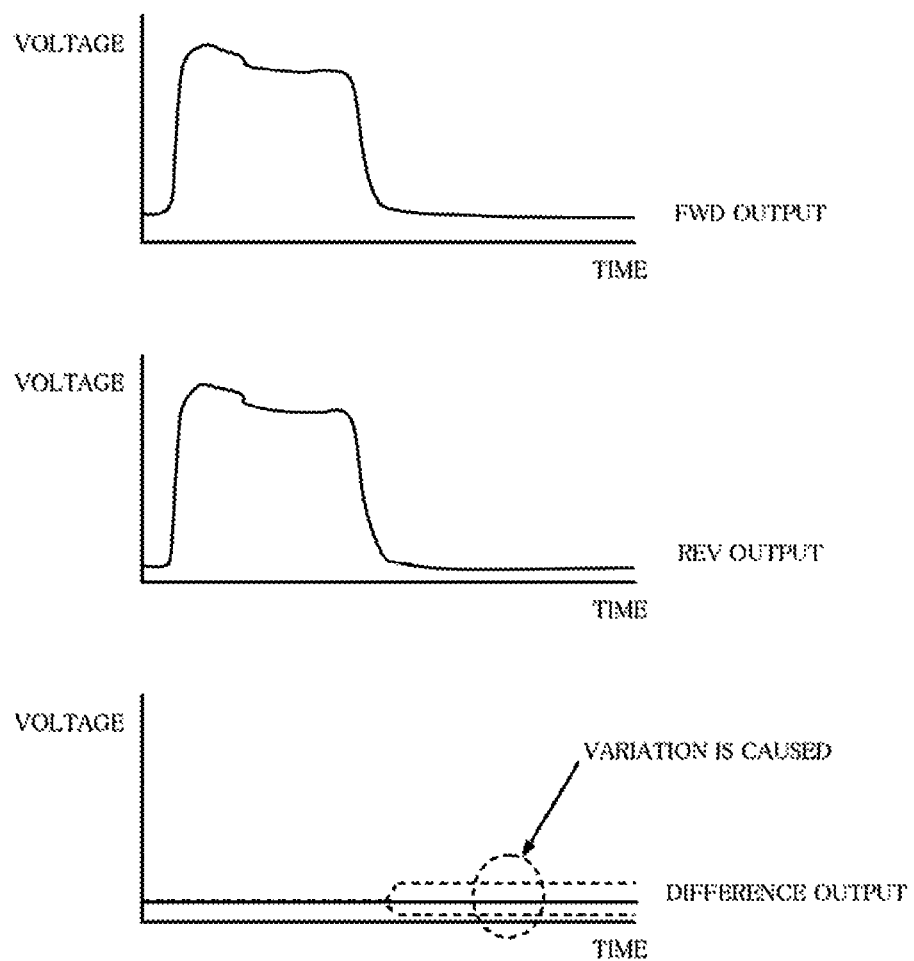
FIG. 9 is a diagram showing temporal changes of an FWD (transmission) voltage, an REV (reflection) voltage, and the difference output between the FWD voltage and the REV voltage in the case where a burst signal is transmitted.

FIG. 9 is a diagram showing temporal changes of an FWD (transmission) voltage, an REV (reflection) voltage, and the difference output between the FWD voltage and the REV voltage in the case where a burst signal is transmitted. The diagram of the upper stage in FIG. 9 is a diagram showing the temporal changes of the FWD (transmission) voltage. Further, the diagram of the middle stage in FIG. 9 is a diagram showing the temporal changes of the REV (reflection) voltage. Further, the diagram of the lower stage in FIG. 9 is a diagram showing the temporal changes of the difference output.

As shown in the diagram of the lower stage in FIG. 9, when the level of the burst signal is low, variations as shown by the broken lines are caused in the difference voltage due to the variation in the detection characteristics.

Figure 10:
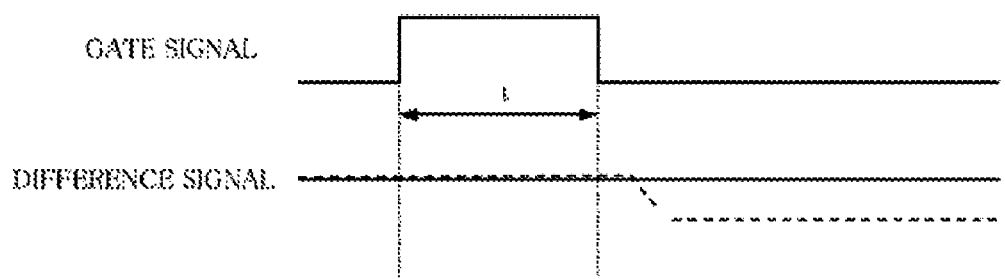
FIG. 10 is a diagram showing a relationship between the gate signal and the difference signal during integration period t generated in the integration period generation section shown in FIG. 2.

FIG. 10 is a diagram showing a relationship between the gate signal and the difference signal during integration period t generated in integration period generation section 500 shown in FIG. 2.

As shown in FIG. 10, the influence of the variation in the detection voltage is eliminated by determining the integration period by the gate signal generated in integration period generation section 500.

Second Exemplary Embodiment

Figure 11:
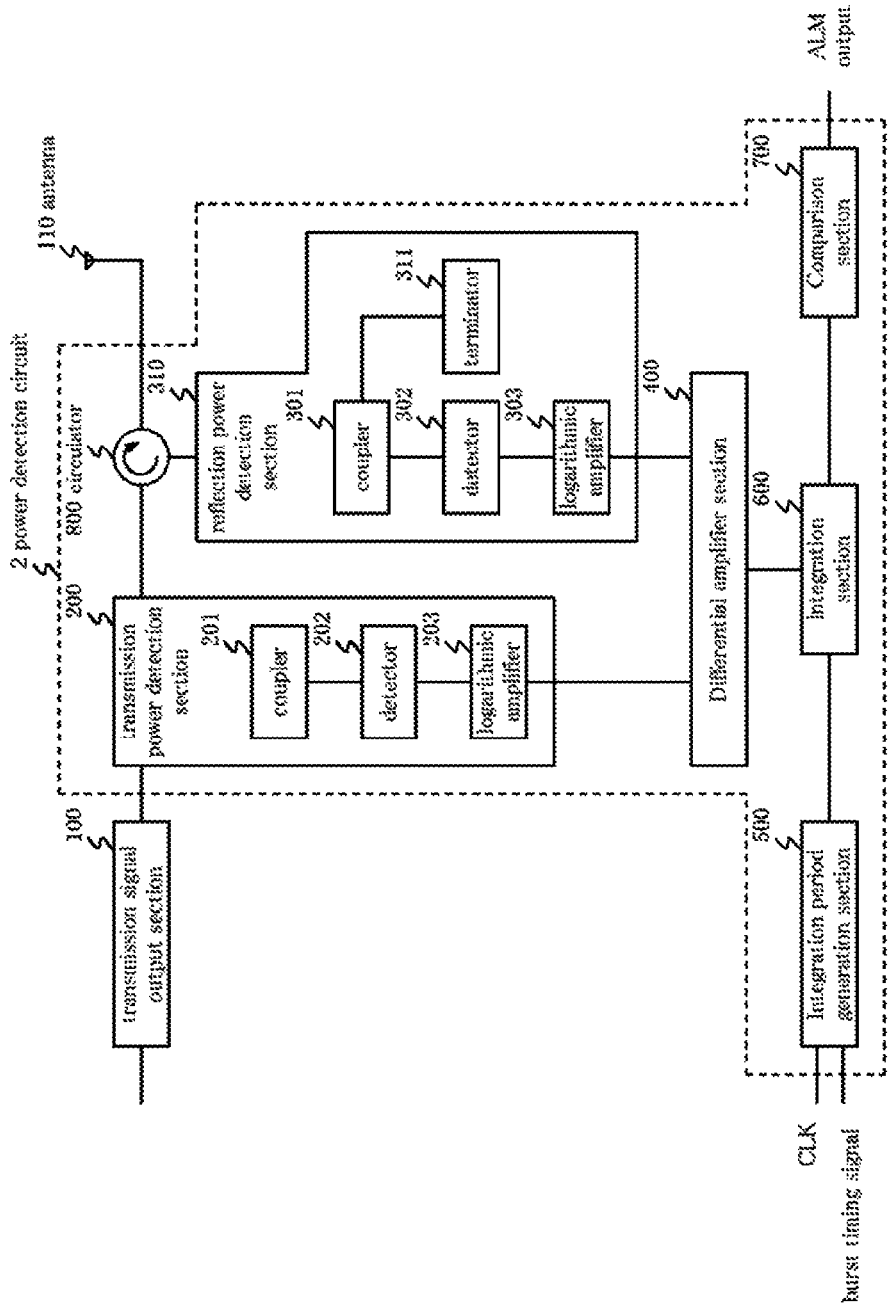
FIG. 11 is a diagram showing a second exemplary embodiment of a power detection circuit according to the present invention.

FIG. 11 is a diagram showing a second exemplary embodiment of a power detection circuit according to the present invention.

As shown in FIG. 11, in power detection circuit 2 according to the exemplary embodiment, circulator 800 is provided between transmission power detection section 200 and antenna 110. Further, coupler 301 and terminator 311 are provided in reflection power detection section 310 connected to the side of circulator 800, which side is seen as an output port side from antenna 110. The same effect as that of the first exemplary embodiment can be obtained because the reflection signal from antenna 110 can be taken out by coupler 301.

Third Exemplary Embodiment

Figure 12:
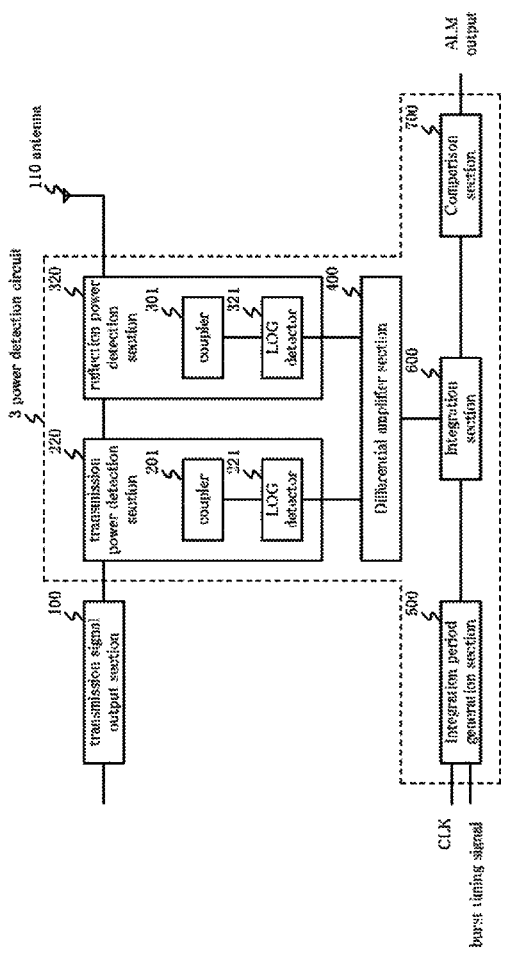
FIG. 12 a diagram showing a third exemplary embodiment of a power detection circuit according to the present invention.

FIG. 12 is a diagram showing a third exemplary embodiment of a power detection circuit according to the present invention.

As shown in FIG. 12, power detection circuit 3 according to the exemplary embodiment is an example in which, in place of detectors 202 and 302 and logarithmic amplifiers 203 and 303 in the first exemplary embodiment, LOG detectors 221 and 321 having logarithmic characteristics are used in transmission power detection section 220 and reflection power detection section 320, respectively. Many devices (ICs) having logarithmic characteristics have been used in recent years. The circuit can be simplified by using the devices having logarithmic characteristics.

Fourth Exemplary Embodiment

Figure 13:
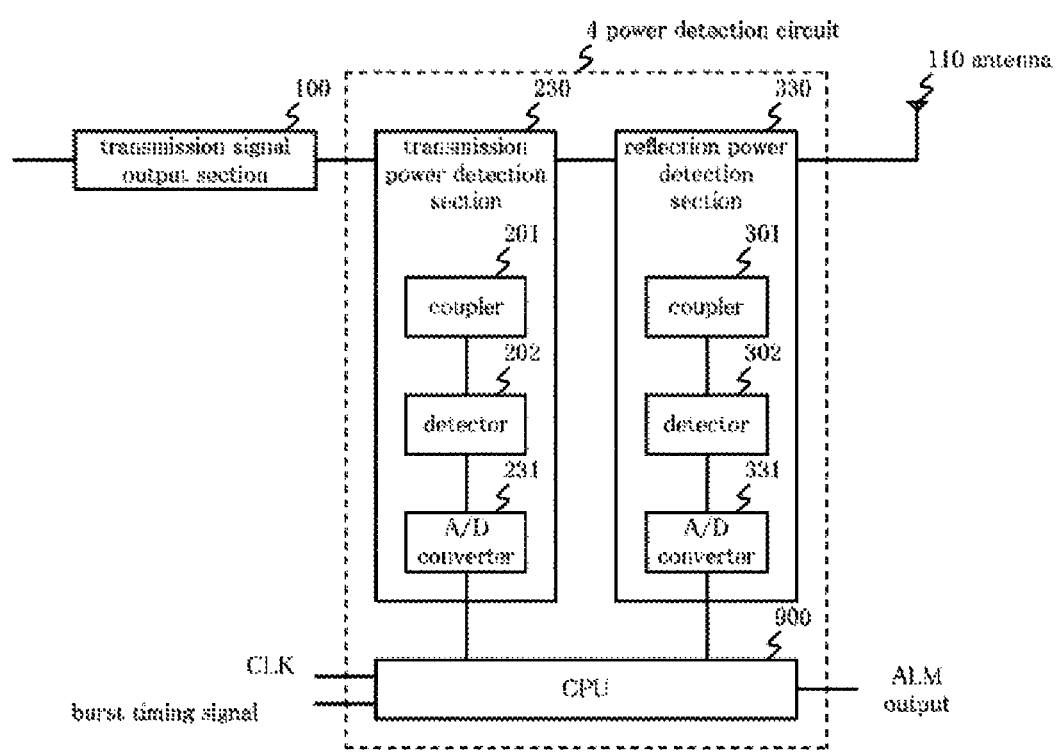
FIG. 13 is a diagram showing a fourth exemplary embodiment of a power detection circuit according to the present invention.

FIG. 13 is a diagram showing a fourth exemplary embodiment of a power detection circuit according to the present invention.

As shown in FIG. 13, power detection circuit 4 according to the exemplary embodiment is an example in which the processing of logarithmic amplifiers 203 and 303, differential amplifier section 400, integration period generation section 500, and comparison section 700 is realized by using firmware of CPU 900. The same effect can be obtained as that of the first exemplary embodiment in such a manner that the detection voltages are respectively converted into digital data by A/D converters 231 and 331 respectively provided in transmission power detection section 230 and reflection power detection section 330, so as to be taken in CPU 900, and thereafter the alarm determination is performed by numerical calculation.

Note that the present invention is particularly useful for application to an apparatus, such as a transmission section of a base station used in a WiMAX (Worldwide Interoperability for Microwave Access) system, which uses a time division duplex system and transmits a burst signal.

Although the invention of the present application has been described with reference to exemplary embodiments, the invention of the present application is not limited to the above described exemplary embodiments. The constitution and details of the invention of the present application are open to various modifications within the scope of the invention of the present application that will be clear to anyone of ordinary skill in the art.

The invention claimed is:

1. A power detection circuit comprising:
   a transmission power detection section that detects transmission power of a transmission signal which, in order to cause a radio signal to be transmitted from an antenna provided in a transmitter for transmitting the radio signal, is outputted to the antenna;
   a reflection power detection section that detects reflection power of a reflection signal reflected from the antenna;
   an integration section that integrates the difference between the transmission power and the reflection power at a timing of transmitting a preamble signal of the radio signal; and
   a comparison section that compares the difference value obtained by the integration performed by the integration section with a predetermined threshold value and that outputs an alarm in the case where the result of the comparison is that the difference value obtained by the integration performed by the integration section is smaller than the predetermined threshold value.

2. The power detection circuit according to claim 1, further comprising
   a differential amplifier section that outputs the difference between the transmission power and the reflection power,
   wherein the integration section integrates the difference outputted by the differential amplifier section.

3. The power detection circuit according to claim 2,
   wherein the transmission power detection section comprises a first directional coupler that branches the transmission signal outputted to the antenna, and
   wherein the reflection power detection section comprises a second directional coupler that branches the reflection signal reflected from the antenna.

4. The power detection circuit according to claim 3,
   wherein the transmission power detection section further comprises a first detector that converts to a first DC voltage the transmission power of the transmission signal branched by the first directional coupler,
   wherein the reflection power detection section further comprises a second detector that converts to a second DC voltage the reflection power of the reflection signal branched by the second directional coupler, and
   wherein the differential amplifier section outputs the difference between the first DC voltage and the second DC voltage.

5. The power detection circuit according to claim 4,
   wherein the transmission power detection section further comprises a first logarithmic amplifier that logarithmically converts the first DC voltage,
   wherein the reflection power detection section further comprises a second logarithmic amplifier that logarithmically converts the second DC voltage, and
   wherein the differential amplifier section outputs the difference between the first DC voltage logarithmically converted by the first logarithmic amplifier and the second DC voltage logarithmically converted by the second logarithmic amplifier.

6. A transmitter comprising:
   the power detection circuit according to claims 1;
   the antenna; and
   a transmission signal output section that outputs to the antenna a transmission signal for causing the radio signal to be transmitted from the antenna.

7. The transmitter according to claim 6, configured to transmit, as the radio signal, a burst-type signal using a time division duplex system.

8. The transmitter according to claim 6, configured to be used in a WiMAX (Worldwide Interoperability for Microwave Access) system.

9. A power detection method comprising:
   a process that detects transmission power of a transmission signal which, in order to cause a radio signal to be transmitted from an antenna provided in a transmitter for transmitting the radio signal, is outputted to the antenna;
   a process that detects reflection power of a reflection signal reflected from the antenna;
   a process that integrates the difference between the transmission power and the reflection power at a timing of transmitting a preamble signal of the radio signal;
   a process that compares the difference value obtained by the integration with a predetermined threshold value; and
   a process that outputs an alarm in the case where the result of the comparison is that the difference value obtained by the integration is smaller than the threshold value.

10. The power detection method according to claim 9, further comprising:
    a process that branches the transmission signal;
    a process that converts the transmission power of the branched transmission signal to a first DC voltage;
    a process that logarithmically converts the first DC voltage;
    a process that branches the reflection signal;
    a process that converts the reflection power of the branched reflection signal to a second DC voltage;
    a process that logarithmically converts the second DC voltage; and
    a process that integrates the difference between the logarithmically converted first DC voltage and the logarithmically converted second DC voltage at the timing.

* * * * *